United States Patent

[11] 3,596,794

[72] Inventor Donald L. Peters
 Bartlesville, Okla.
[21] Appl. No. 877,642
[22] Filed Nov. 18, 1969
[45] Patented Aug. 3, 1971
[73] Assignee Phillips Petroleum Company

[54] SUPPORTING APPARATUS
 5 Claims, 3 Drawing Figs.
[52] U.S. Cl. .................................................. 220/71
[51] Int. Cl. .................................................. B23k 27/00
[50] Field of Search ...................................... 220/71, 15

[56] References Cited
UNITED STATES PATENTS
1,686,931 10/1928 Russell .......................... 220/71
1,757,923 5/1930 Russell .......................... 220/71
3,025,995 3/1962 Koelsch et al. ................ 220/71

Primary Examiner—Allen N. Knowles
Attorney—Young and Quigg

ABSTRACT: An apparatus for insertion within an internal column of a vessel for supporting said column and vessel.

PATENTED AUG 3 1971  3,596,794

INVENTOR.
D. L. PETERS
BY Young & Quigg
ATTORNEYS

SUPPORTING APPARATUS

This invention relates to an apparatus for supporting a column of a vessel. In another aspect, this invention relates to an apparatus for exerting forces on a column of a vessel to maintain the column against damage from impact forces exerted on a vessel.

In the manufacture of vessels, particularly unitary blow-molded plastic vessels for containing liquids, it has been found that supporting columns within the vessel are desirable to maintain the vessel against damage from impact forces exerted on the vessel. These columns are easily formed during the blow molding process of the vessel by extending adjacent walls of the vessel toward one another and for fusing said walls to the other within the chamber of the vessel. It has been discovered, however, that these molded columns often fail when the vessel is subjected to relatively severe dynamic forces, such as the impact forces sometimes exerted on a gasoline tank of an automobile during normal driving conditions.

It is therefore an object of this invention to provide an apparatus for supporting a column of a vessel. In another aspect, it is an object of this invention to provide an apparatus to exert a force on the structure forming the column of a vessel for maintaining the column against damage during impacts upon the vessel. Yet another object of this invention is to provide an apparatus of the above described type that is easy to manufacture and install and requires little maintenance. Other aspects, objects and advantages of the present invention will become apparent from a study of the disclosure, the appended claims, and the drawing.

Figure 1:
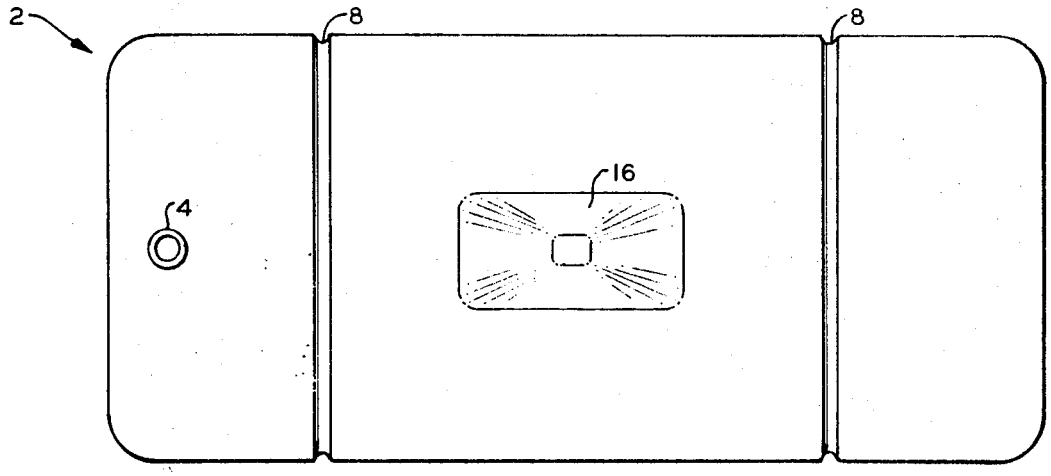
FIG. 1 is a diagrammatic planned view of a vessel having an internal column.

Referring to FIG. 1, a vessel, for example a unitary blow-molded gasoline tank, is of substantially rectangular shape, has an opening 4 formed on said vessel 2 in communication with the chamber 6 of the vessel 2 (better seen in FIG. 2), and for attaching the vessel 2 to a structure for example.

Figure 2:
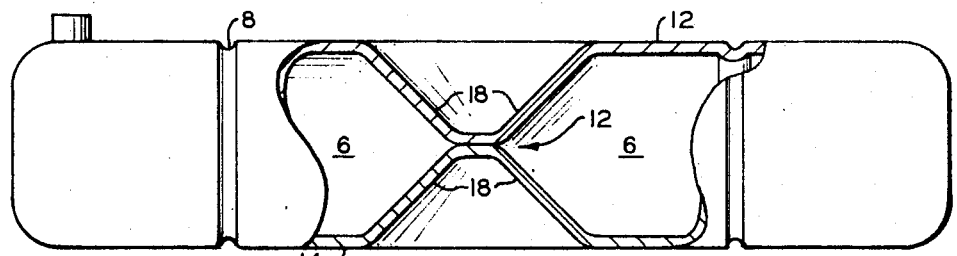
FIG. 2 is a diagrammatic frontal view of FIG. 1 showing the column of the vessel in partial section.

FIG. 2 shows a column 10 of the vessel 2. The column 10 is formed, for example, during the blow molding of the vessel 2 by extending portions of the adjacent first and second walls 12,14 into the chamber 10 and fusing one wall to the other. Forming of the column 10 in this manner causes the first and second walls 12,14 each to have a recessed area 16. Fusing adjacent walls of a vessel one to the other is well known in the art of blow molding and is sometimes called kissoffs. It should be understood that the apparatus of this invention is particularly useful in unitary blow-molded vessels, but can be used with other vessels having internal supporting columns such as metal tanks with supporting columns having a hole extending therethrough and being welded to adjacent first and second walls of the vessel.

Figure 3:
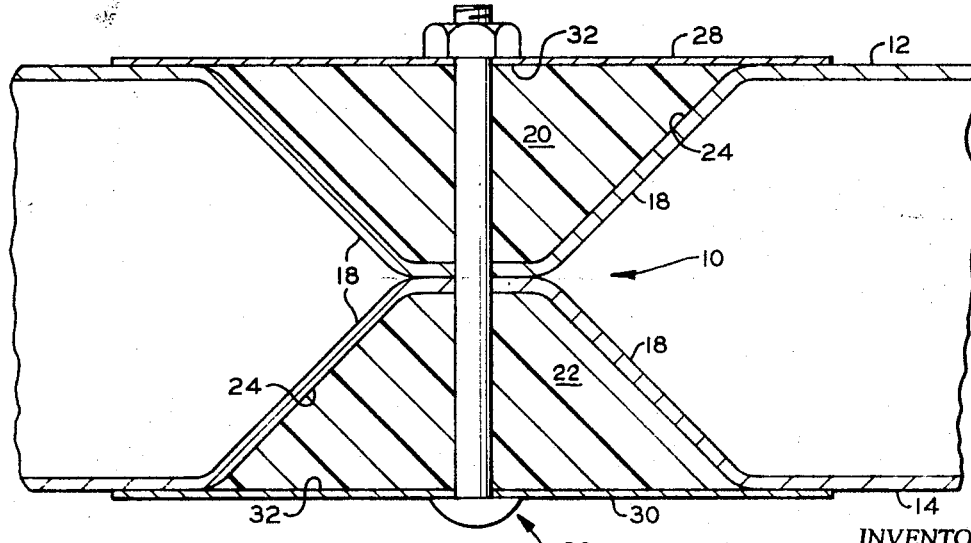
FIG. 3 is an enlarged diagrammatic view of the column of FIG. 2 with the apparatus of this invention installed thereon.

FIG. 3 shows portions of the adjacent first and second walls 12,14 of vessel 2 and the column 10. It is important that the walls 18 of each recessed area 16 extend into the chamber 6 of the vessel 2 at an angle less than 90° relative to the plane of their respective first and second vessel walls 12,14 (to be later described).

First and second supporting elements 20,22 are positioned within the recessed area 16 of the first and second walls 12,14 in contact with substantially the entire inner surface 24 of the walls 18 of the recessed area 16. The first and second elements 20,22 can be formed of plastics such as epoxies, solid or porous polyolefins, etc. wood, metals, plastic-coated metals, and the like. In a case where the vessel 2 is blow molded from linear polyethylene it is preferred that the first and second elements 20,22 be also formed of polyethylene. Where the vessel 2 and the elements 20,22 are of the same material, the appearance of the resultant vessel is improved, the column is not scored and weakened by movement of one element in contact with the column 10, and forces exerted on the elements and the column of the biasing means 26 (to be later described) will not cause unequal compressing of one relative to the other. It is also preferred that the first and second supporting elements 22,24 be slightly larger at least in one dimension than the inside diameters of the associated recessed area 16 so that installation of the elements 20,22 into contact with the recessed area walls 18 not only support said walls 18 against lateral movement but exert small forces against substantially the entire area of the walls 18 which forces are transmitted through the walls 18 and place relatively small tensile forces in the adjacent first and second walls 12,14 of the vessel 2 thereby additional strengthening vessel 2. Placing tensile forces in the first and second walls 12,14 of the vessel have been found to be particularly advantageous in vessels 2 holding relatively large weights of liquid, having few supporting columns, or which are subjected to a relatively large number of impacts of a relatively greater magnitude. In order to impart forces on the walls 18 with the elements 20,22 it is important, as described above, that the walls 18 be at an angle of less than 90° relative to the first and second walls 12,14. By so constructing the walls 18 of the recessed area 16, the forces exerted by the biasing means 26 is transferred through the elements 20,22 to said walls 18.

After the first and second supporting elements 20,22 are inserted into the recessed area 16, first and second retaining plates 28,30 are placed over said elements 20,22. Each retaining plate 28,30 has dimensions sufficient to extend transversely across an outer surface 32 of its respective element 20 or 22 and a portion of the vessel wall 12 or 14 on at least two opposed sides of the element 20,22. A biasing means 26, such as a bolt and nut for example, extends through a coaxial hole formed through the retaining plates 28,30 supporting elements 20,22 and the column 10, and urges the plates 28,30 and the elements 20,22 toward one another for maintaining the elements 20,22 in contact with the walls 18 of the recessed area 15 and exerting forces on said walls 18 as desired. For more uniform transfer of pressure through the elements 20,22 and additionally supporting the column relative to the first and second walls 12,14, it is preferred that the retaining plates 30,32 each cover the entire outer surface 32 of the respective elements 20 or 22 and a portion of the wall adjacent the entire periphery of the respective recessed area 16. It is also preferred that the retaining plates 28,30 be formed of metals such as steel, preferably plastic coated on the side adjacent the vessel to permit abrasion in order that they can be or relatively small bulk and yet be sufficiently rigid so as to not be detrimentally deformed by the biasing means. The amount of tension to be placed in the biasing means and the walls 12,14 depend upon the dimensions and construction of the vessel 2 and supporting elements 20,22 and it is a value that can be readily calculated by one skilled in the art.

An example of the apparatus of this invention is as follows:

EXAMPLE I

A linear polyethylene resin characterized by a density of about 0.952 gms./cc. (ASTM D 1505–63T) and a melt index of about 0.2 (ASTM D 1238–62T) was used to blow mold a hollow, flattened, rectangular shaped vessel of about 22 gallons nominal capacity. Such a vessel was constructed to hold gasoline for vehicles. The empty vessel weighed about 15 pounds. One centrally located supporting column was integrally molded in the vessel as it was formed.

Two wooden blocks were shaped to fit the external depressions on either side of the vessel resulting from forming the support column. They were placed in said depressions and secured by means of a ¼-inch diameter bolt about 6 inches long passing through a hole drilled through retaining plates, the wooden blocks and the solid core of the plastic column.

The retaining plates were 2 inches wide, steel straps about one-sixteenth inch thick, extending about 2 inches past each end of the block. Two such tanks were so prepared and nine others without the support means served as controls.

To determine the impact resistance of the vessel filled with a liquid and the effect of the hydrostatic pressure against the support column, each tank was filled with about 185 pounds of water, the closure was applied, and the tank was dropped from a height indicated in the table. Except for sample 09, each tank was dropped so it would hit flat on its side. In the table, X means a break and 0 means no break.

FLAT DROP IMPACT RESULTS

| Internal column | Sample No. | \multicolumn{11}{c}{Drop height, feet} | Remarks |
|---|---|---|---|---|---|---|---|---|---|---|---|---|---|
| | | 0.5 | 1 | 2 | 3 | 4 | 5 | 6 | 7 | 8 | 9 | 10 | |
| Unsupported | 1 | | | | | | | | | | | X | Side and column ruptured. |
| Do | 2 | | | | | | X | | | | | | Do. |
| Do | 3 | | | | X | | | | | | | | Column ruptured. |
| Do | 4 | | X | | | | | | | | | | Do. |
| Supported | 5 | | O | X | | | | | | | | | Do. |
| Do | 6 | | O | O | O | O | O | X | | | | | Side and column ruptured. |
| Unsupported | 7 | | | X | | | | | | | | | Column ruptured. |
| Do | 8 | | | X | | | | | | | | | Do. |
| Do | 9 | X | | | | | | | | | | | Do. |
| Do | 10 | X | | | | | | | | | | | |
| Do | 11 | (¹) | (¹) | (¹) | (¹) | (¹) | (¹) | (¹) | (¹) | (¹) | (¹) | (¹) | |

¹ Stood on end and tipped over, column ruptured.

Except for samples 5 and 6, only one drop test was made at the indicated height. Inspection of the tab reveals that vessels with no column support means broke at all heights tested from 6 inches to 10 feet. Sample 5 survived a 2-foot drop but ruptured when dropped at 3 feet. Sample 6 survived consecutive drops from 2 feet through 6 feet and finally ruptured at 7 feet. The performance difference between samples 5 and 6 resides in the different clamping forces used to hold the support means together. In sample 5 the nut was snugged up to finger tightness whereas in sample 6 a wrench was used to tighten the nut. It has been discovered that the nut should be made up of sufficient tightness to place portions of the tanks in stress as described above.

Other modifications and alterations of this invention will become apparent to those skilled in the art from the forgoing discussion and accompanying drawing, and it should be understood that this invention is not to be unduly limited thereto.

What I claim is:

1. An apparatus for supporting a column of a vessel, said vessel having adjacent first and second walls and a chamber with portions of the first and second walls extending into the chamber and being fused one to the other for forming the column and first and second recess areas on the first and second walls of the vessel, comprising:
   first and second supporting elements, each element having a hole extending therethrough and being positioned within the recessed area of its respective wall and in contact with substantially the entire surface of the portion of the wall forming the associated recessed area;
   first and second retaining plates, each plate having a hole formed therethrough and being of a dimension sufficient to extend transversely across an outer surface of a respective element and a portion of the wall on at least two opposed sides of said element; and
   biasing means extending through the column, via elements and the plates for urging the plates and the elements toward one another and supporting the column.

2. An apparatus, as set forth in claim 1, wherein the elements are formed of polyethylene.

3. An apparatus, as set forth in claim 1, wherein the retaining plates cover a portion of the wall adjacent the entire periphery of the recessed area.

4. An apparatus, as set forth in claim 1, wherein the walls of each recessed area extend into the chamber at an angle less than 90° relative to the plane of their respective first and second walls on substantially the entire recessed wall area in response to urging of the first and second elements toward one another by the biasing means.

5. An apparatus, as set forth in claim 1, wherein the vessel is a unitary blow molded polyethylene vessel and the first and second elements are formed of polyethylene and the first and second plates are formed of metal.